Figure 1:
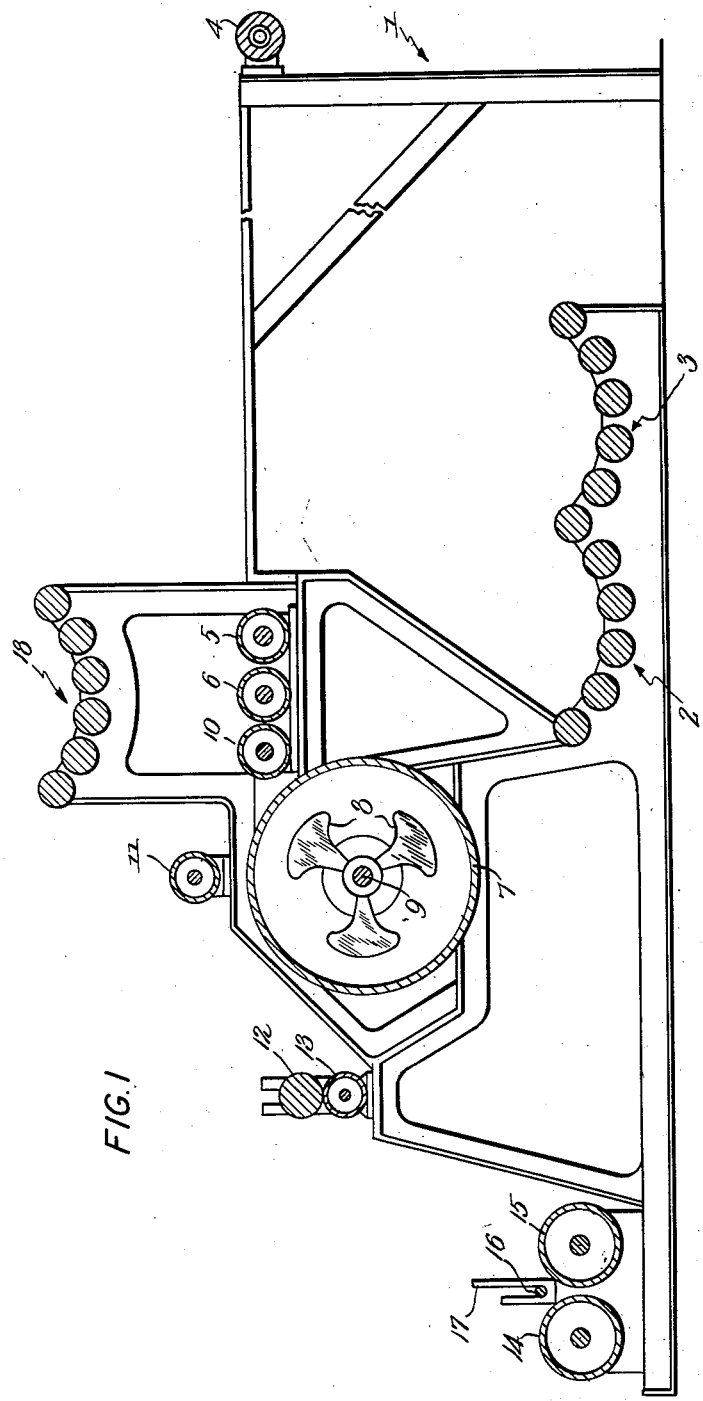

INVENTOR-
HERBERT H. KENWORTHY
ATT'YS.

March 5, 1957 H. H. KENWORTHY 2,783,820
APPARATUS FOR PREPARING LAMINATED
MATERIAL, PARTICULARLY
AS SHOE UPPERS
Filed Jan. 28, 1953 4 Sheets-Sheet 4

INVENTOR
HERBERT H. KENWORTHY
BY
ATT'YS.

United States Patent Office 2,783,820
Patented Mar. 5, 1957

2,783,820

APPARATUS FOR PREPARING LAMINATED MATERIAL, PARTICULARLY AS SHOE UPPERS

Herbert H. Kenworthy, Westboro, Mass.

Application January 28, 1953, Serial No. 333,713

1 Claim. (Cl. 154—37)

This invention relates to apparatus for and to a method of preparing for use various materials or products by providing upon the outer top surface thereof a very thin coating of a thermoplastic adhesive that becomes activated only at a temperature of about 180° to 250° F., and to which outer top surface the operator may apply either a sheet of material or a multiplicity of small units of some material in sheet form. Such materials or products may be used, for example, in the manufacture of shoes as, for instance, shoe uppers. They may also be used in the manufacture of certain athletic goods and sporting goods using reinforced leather, and in the manufacture of slippers and of women's purses and pocketbooks, and for other purposes, as will be more fully referred to subsequently.

In order that the principle of the invention may be readily understood, I have disclosed somewhat diagrammatically several embodiments of apparatus whereby the method of the invention may be practiced and through which apparatus, in practicing my method, may be fed one, two, three, or more long sheets of fabric or like sheet material, the upper face of the topmost sheet thereof having applied, in accordance with my invention, a very thin coating of thermoplastic adhesive that will become activated only at a high temperature of about 180° to 250° F. In the event there are thus fed through the apparatus a plurality of sheets in face-to-face relation, a very thin coating of cementitious material will have been previously applied to at least one inner surface, so that in the event two sheets are fed together in face-to-face relation, the said two sheets will have been laminated together by such thin coating. In the event that three fabrics are to be fed together in a face-to-face relation through the apparatus, thin coating layers will have been applied to two inner surfaces, that is, for example, to the upper face of the intermediate fabric and to the upper face of the lowermost sheet of fabric. In the event that four fabrics are to be fed together in a face-to-face relation, the upper face of the second fabric, the upper face of the third fabric, and also the upper face of the fourth fabric will have been precoated. Thus fed, two, three, or four fabrics are in a laminated together condition in their passage through the apparatus.

In accordance with my invention, whether one, two, three or four fabric sheets be fed through the apparatus, all laminated together, I apply previously a very thin thermoplastic adhesive coating to the uppermost surface, which coating becomes activated only when its temperature is raised to a point between 180° and 250° F. To that upper surface may then be applied, in the apparatus itself shown in Figs. 1, 2 and 3, either another fabric, or a sheet of equal width and of any desired length, or a multiplicity of small units of skin or other materials, which fabric sheet or small units will, in the operation of the apparatus shown in Figs. 1, 2 and 3, be laminated onto the said coated upper surface, and by reason of the application of the necessary degree of heat, as, for example, while the entire material is fed about the heated surface of a cylindrical drum the temperature of which has been raised to the necessary degree.

Figure 2:
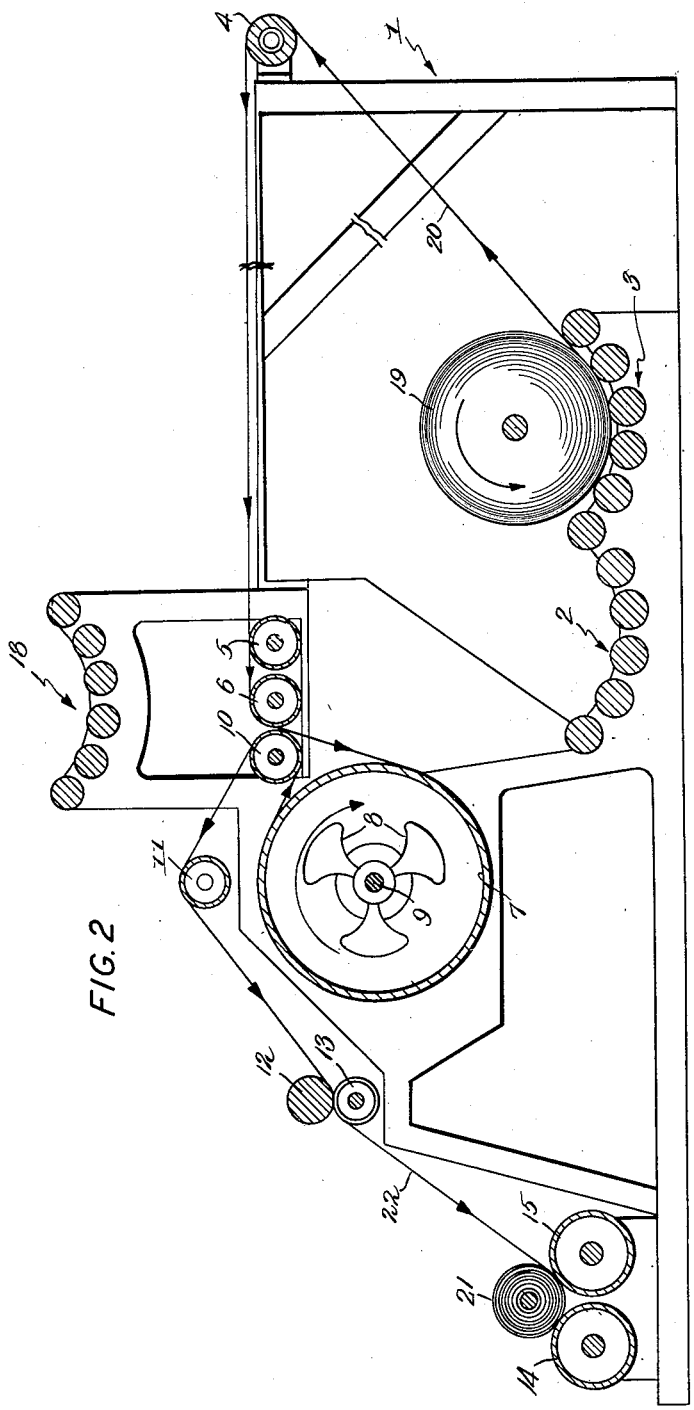
Figure 3:
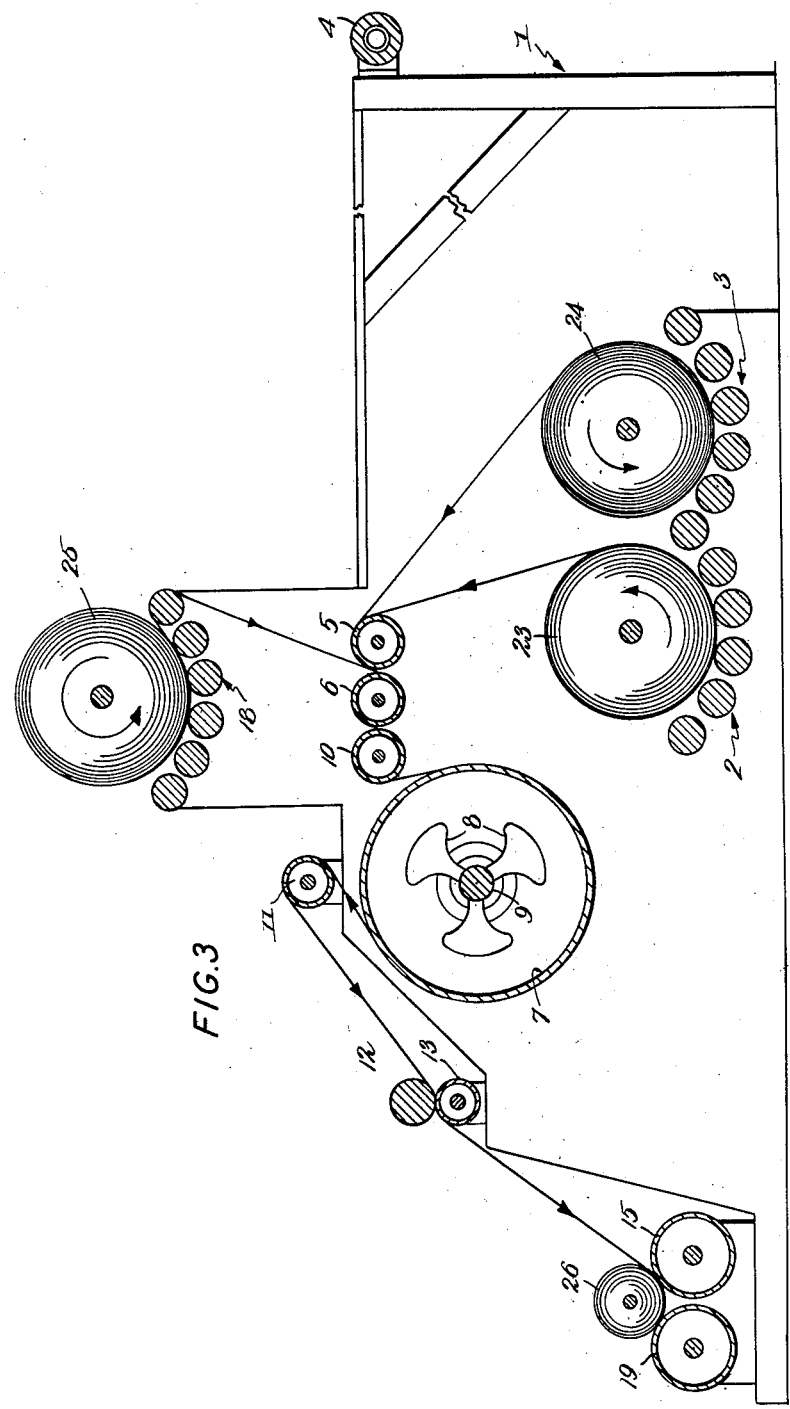
Figures 4, 5:
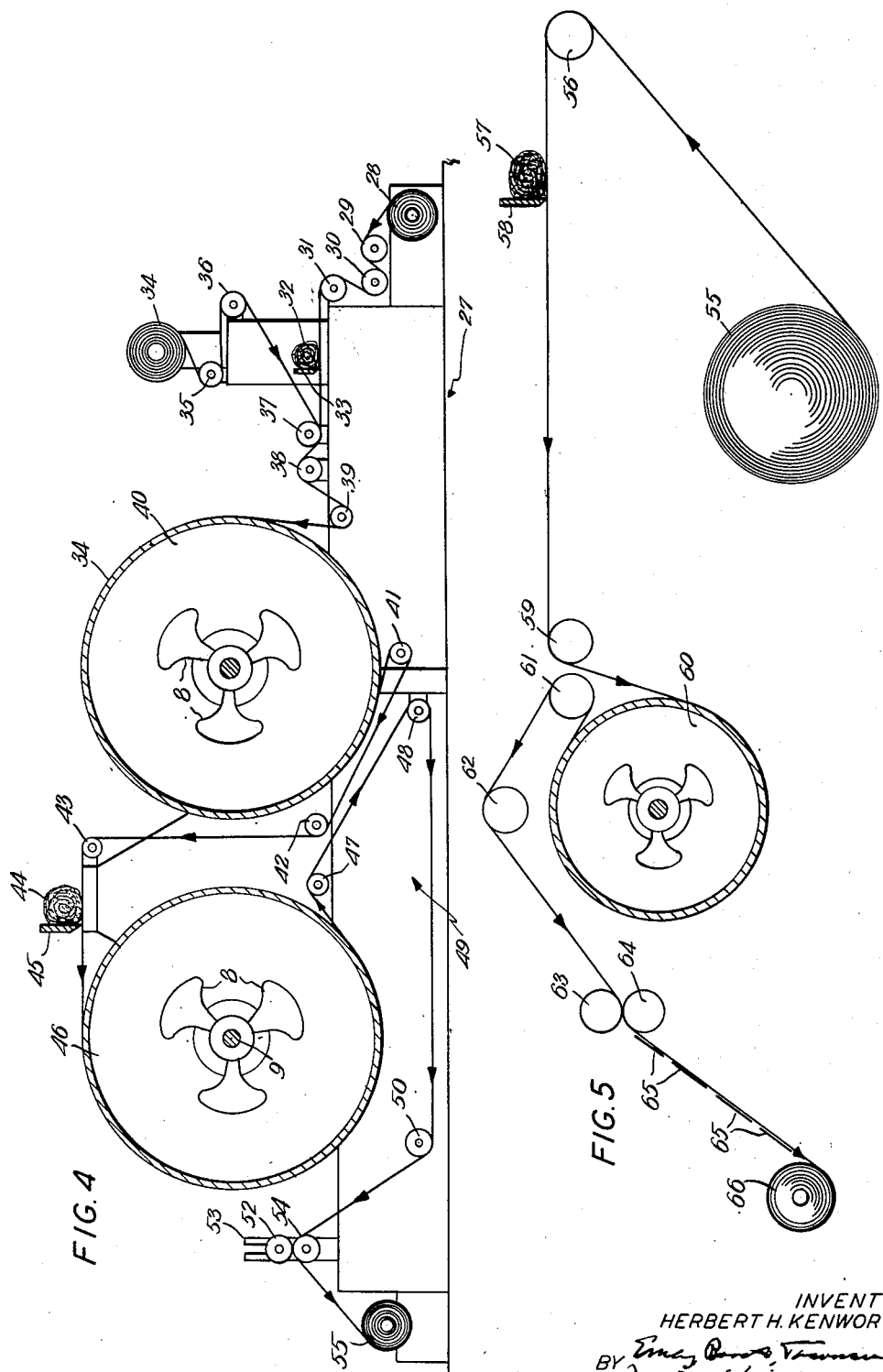

In the drawings:

Fig. 1 is a longitudinal section of the apparatus of my invention and which is of relatively small size and which is supplied or to be supplied by me to manufacturing plants or factories wherein the material is to be used, and to and through which apparatus there may be fed one sheet or a plurality of sheets of a base or foundation fabric material that has or have been precoated, and to the upper surface of such one sheet, or to the uppermost surface of a plurality of previously laminated sheets, there has been applied the very thin coating of thermoplastic adhesive that becomes activated only at a temperature of 180° to 250° F., and to which coating may be applied whatever material the user of the apparatus desires, whether it be another sheet of equal width or a plurality of small units of skin or other material;

Fig. 2 is a view similar to Fig. 1, and showing one precoated fabric being fed through the apparatus, and the thermoplastic adhesive which has been previously applied to a face thereof is, while passing through the apparatus, sufficiently heated to become activated during its passage through the apparatus, as by being raised to a temperature of about 180° to 250° F., so that either in the progress of the fabric sheet through the apparatus another sheet of full width or a multiplicity of small units may be manually applied thereto and become laminated therewith, or the single fabric sheet may be promptly cut after its passage through the apparatus into small units for use in the manufacture of the articles that are being made in the plant wherein the apparatus has been placed, or such small units may have other material laminated thereon;

Fig. 3 is a view similar to Figs. 1 and 2, but through which apparatus two fabric sheets of indefinite length, both precoated, and a third uncoated fabric sheet are being together fed, and during their progress therethrough the said fabric sheets are sufficiently heated, as by passing about a heated cylinder or drum, so that the temperature of the applied thermoplastic adhesive is raised to a temperature of about 180° to 250° F. and hence becomes activated, so that in the progress of said three fabric sheets through the apparatus, they all become laminated together and may immediately after delivery be severed into small, laminated units for immediate use in shoe or like manufacture;

Fig. 4 is a longitudinal section through an apparatus which is preparatory to that shown in Figs. 1, 2 and 3 and where through two fabric sheets of indefinite length are being fed, and to one surface of the each of which fabric sheets adhesive material is applied as the fabric sheets travel through the apparatus and are heated during their passage, after the coating of adhesive material has been applied, so that such adhesive thereby becomes activated and consequently said two fabric sheets issue from the apparatus in a laminated condition and are then to be fed into the apparatus shown in Figs. 1, 2 and 3; and Fig. 5 is merely a diagrammatic representation of the feeding of a single fabric sheet of base material through an apparatus which may be generally similar to that shown in Fig. 4, but to a surface of which fabric sheet a thin coating of thermoplastic adhesive is applied as the fabric sheet travels through the apparatus and which adhesive becomes activated as the fabric sheet passes about a heating cylinder or drum, by which the temperature of the adhesive is raised to a temperature of about 180° to 250° F., and to the adhesively coated surface of which small units of skins or other material may be manually, carefully applied, and instead of being immediately trimmed therefrom may temporarily be rolled up in such condition. Such a product would not, of course, be subsequently passed through the apparatus of Figs. 1, 2 and 3, as it is in its final condition.

I am aware that liquid adhesives have been applied to one or more sheets or pieces of fabric material for the purpose of producing laminated material for use in the manufacture of certain products after such laminated material has become dry. I am also aware that adhesives that become activated only when sufficiently heated have been applied to sheet material in certain stages of the manufacture of certain products—among which may be mentioned shoes, certain athletic or supporting goods, as for reinforcing leather material therein, slippers, pocketbooks and purses—but only by the use of quite large and complicated mechanism, or by hand tools, such as flatirons, and using small lamps, such as sun lamps, to heat the fabric. I, on the contrary, by my herein disclosed invention have provided a quite simple and small and readily operated complete apparatus that may be easily moved about in a factory or plant where products such as those to which I have just referred are made. Such apparatus of my invention is or is intended to be built by me and leased to manufacturing plants of various types, so that such plants may readily, by the relatively small apparatus herein disclosed in Figs. 1, 2 and 3, quickly prepare the laminated material for immediate use in the manufacture of such articles as are herein referred to and other appropriate articles that are made in such manuafcturing plants.

Heretofore, each plant or factory has had the desired material laminated at some other place and then shipped to the plant or factory for use, but the material has not been prepared in the plant or factory—or only by complicated and expensive mechanism. My entire apparatus as disclosed in Figs. 1, 2 and 3 is readily portable and there is no hazard from any solvent. It is a simplified equipment that can be operated at a plant or factory by unskilled help.

The materials to be treated by the apparatus of my invention, to name only a few, are, for example, any materials suitable for use in shoe manufacture, as for the uppers thereof, or linings, and may, for instance, be faille, or drill, or vinyl-coated linings, or pyroxylin coated linings, or suedes, or vinyl-coated grained material, or other fabrics. Skins or hides may be used as the relatively small units that are applied, preferably manually, to the base fabric sheet or any other suitable material.

The adhesive that I employ in the practice of my invention is in contrast to a liquid adhesive and is what I term a relatively "dry," that is, a thermoplastic or like adhesive, by which is meant one that becomes activated only at an elevated temperature, as, for example, of about 180° to 250° F. Among the adhesive materials that I may use, and which become activated only at an elevated temperature, I mention the following: a thermoplastic or a thermosetting adhesive, such, for instance, as a vinyl acetate and that may be broadly defined as a synthetic resin; also adhesives having rubber as the base material; also the following: adhesives having Buna S or GR–S as the base material, also adhesives haviny Hycar as a base material; also vinyl chromide; or Geon, manufactured by F. R. Goodrich; also thermoplastic glue; also the Monsanto Company film or thermoplastic material supplied in rolls; also gutta-percha; and also, though less satisfactory, an adhesive powder may be used.

The foregoing is not a complete list. I may with any of them use some compound that aids in redering them actionable at about 180° to 250° F., that is, between such limits.

I include and specify the foregoing in the specification and claims as what I term a relatively "dry" or thermoplastic adhesive to distinguish the same from liquid or near-liquid that does not need to be heated to render it active.

Now, referring more particularly to the drawings, and first to Figs. 1 and 2 thereof, which show a preferred embodiment of the apparatus of my invention, I have represented the framing of the apparatus at 1, but the right-hand end or table portion thereof may be readily detachable from the portion thereof that is shown at the left in Figs. 1 and 2, as, for example, by the use of suitable hooks or latches, or other attaching means. The framing of the apparatus without the said preferably detachable table portion is desirably about 30 inches in length and about 30 inches in height at the level at which the base fabric sheet is introduced, and is about 44 inches in width so as to accommodate fabric sheets customarily of a width of 40 inches. Such framing is sufficiently wide to accommodate fabric sheets of any of the widths that are customarily employed.

I have represented what I term "cradles" at 2 and 3 respectively, but which cradles may be located somewhat further to the left than as shown in Figs. 1 and 2, particularly if the table portion shown at the right is removed so as to render the apparatus as compact as possible. Each of said cradles consists of a series of rolls arranged arcuately, each such cradling roll being of a length that is at least the width of the fabric material or materials that rest as a roll or rolls thereon for easy unwinding as drawn upon by the driven rolls of the apparatus, which may be any desired rolls thereof. The said cradle rolls 2, 3 are preferably each mounted at both ends in roller bearings for easy rotation as the fabric sheets are unwound.

The fabric sheet or sheets that is or are being acted upon by the apparatus passes or pass about a roll 4, (in the event the table portion is being employed), mounted for free rotation at the incoming or right-hand end of the apparatus, and then along the level, unencumbered top of the table portion of the framing, as indicated in Fig. 2, and which at its left-hand end is desirably detachably connected by any suitable means to the other portion of the apparatus so that it may be entirely removed if desired, in which event the fabric would be led directly up from the cradle in which it is supported for delivery.

In the construction shown in Figs. 1 and 2 the fabric then passes over two rolls 5 and 6, which may, if desired, be positively rotated in a forward direction, and then down under and about and up over a driven cylinder or drum 7, then up and under and over the roll 10, which is preferably driven, then up over the roll 11, then down between the rolls 12, 13, at least the lower one of which is preferably driven, and then down to the rolls 14, 15, which are positively rotated in a forward direction, and above and resting upon which is the roll of accumulating fabric material, the axial rod or bar passing through the same being indicated at 16 as supported by bearings 17.

If desired, the entire apparatus may be mounted on drop-leg casters, or it may be stationary. The apparatus including said driven cylinder or drum 7 and the other positively rotated parts mentioned along with a conventional motor is preferably electrically driven by having suitable wiring adapted to be plugged into a suitable source of electric power such as is usual in households, as, for example, with small motor-driven laundry equipment.

The drum or cylinder 7, which is preferably composed of two half-cylinders so that it can be opened up when desired, is provided interiorly with carefully safeguarded means for heating the periphery thereof to a suitable temperature, such as about 250° F. For this purpose I have represented at 8 three infra-red electric lamps or bulbs which are, however, provided in three sets of three each and which are mounted upon a fixed rod or bar 9 and which are suitably connected electrically. I also provide, but have not here illustrated, a thermostat to control the temperature of the cylinder 7 and a thermostat to control the lamps which, as stated, may be nine in number.

At the upper part of the framing 1, above the rollers 5, 6, and 10, is another cradle 18 of rollers similar to those constituting the cradles 2 and 3 and similarly mounted, and which is for the purpose of feeding through the apparatus still another roll of fabric material, as shown in Fig. 3, to become laminated with the other sheets and which will be referred to further in connection with that figure.

The apparatus shown in Fig. 2 is or may be identical with that shown in Fig. 1, and is indeed the same apparatus as there shown, but there is represented in Fig. 2 a single sheet of fabric material being positively fed therethrough. Such single fabric sheet is indicated as a roll 19 supported upon the rollers constituting the cradle 3. It is unnecessary that the roll of fabric material 19 be provided with an axial rod or bar passing axially therethrough. It is sufficient to position the roll of fabric 19 upon the rollers of the cradle. The fabric is positively drawn therefrom as indicated at 20. It is then drawn about the guiding roll 4, then along the flat, unobstructed top of the table portion of the framing (here shown as in use), then over rolls 5, 6, and about the cylinder or drum 7, then about the roll 10, and finally it is wound up in roll form at 21, resting upon the rolls 14 and 15.

The apparatus of my invention shown in Figs. 1 and 2 is not represented as having means to apply a relatively dry thermoplastic adhesive to a surface of the fabric sheet, as the fabric represented in Fig. 2 has been precoated at one surface thereof in some other apparatus, such as that of Fig. 4, and the upper surface of such fabric is marked in Fig. 2 as precoated.

In the operation of the apparatus shown in Figs. 1 and 2, and wherein the upper surface of the single sheet of material shown in Fig. 2 has been precoated, it is the purpose in one manner of use thereof at the plant or factory to have manually applied to the upper surface of the fabric, after it has passed about the cylinder or drum 7 and has been heated so that the temperature of the adhesive has been raised to 180° to 250° F., and hence has become activated, small units of some material such as skins or portions of hides or any other desired material in small units, as, for example, at about the area 22 in Fig. 2 just prior to the rolled-up fabric portion 21. Such small units can be carefully laid on and smoothed down by unskilled help and at such places of the fabric surface as to use up a very high percentage of the fabric sheet 20. Inasmuch as the thermoplastic adhesive applied as a precoating has been activated in the passage of the successive portions of the fabric sheet 20 about the heated cylinder or drum 7, as soon as the small units are manually laid smoothly on the upper surface of the fabric 20 and suitable pressure is applied, such small units become immediately laminated therewith, and the fabric 20 having laminated therewith such small units is wound up into the roll 21 and is now ready to be cut into small pieces for use.

In Fig. 3 I have represented the same apparatus of my invention as in Fig. 1, but I have represented three fabric sheets as being positively fed therethrough, being numbered respectively at the unrolled portions thereof as 23, 24 and 25, being supported freely upon the cradles 2, 3 and 18 respectively. One surface of each of the sheets 24 and 25 has been precoated, as indicated, but neither surface of the fabric 23 has been precoated.

In the operation of the apparatus represented in Fig. 3, the fabric 23 is at the under side of the fabric 24, and and the fabric 25 overlies the fabric 24. All three fabrics pass together about the highly heated cylinder or drum 7, so that the uncoated fabric sheet 23 becomes laminated with the under face of the fabric sheet 24, the precoated under surface of which has the now activated thermoplastic adhesive, and the fabric sheet 25 becomes laminated with the upper surface of the fabric sheet 24, as the thermoplastic adhesive at the under surface of the fabric sheet 25 has become activated, and hence said fabrics 24 and 25 become laminated together. Thus all three fabric sheets 23, 24 and 25 are laminated together and are in that condition rolled up as the laminated three-sheet fabric into the roll 26, which is now ready for use in the plant or factory as soon as cut or otherwise severed into small units, or into larger pieces if their intended use so requires.

In Fig. 4 is represented an apparatus for preparing a plurality of sheets to be fed through the apparatus shown in Figs. 1, 2 and 3 and there treated as already described. In Fig. 4 are represented two fabric sheets neither of which has been precoated, means being provided in the apparatus itself of Fig. 4 for applying the relatively dry adhesive at one point to one surface of one of said fabric sheets and at another point to both surfaces of the other fabric sheet, so that a third fabric sheet or small units may be laminated thereto subsequently by the apparatus shown in Figs. 1, 2 and 3.

The relatively dry adhesive applied as described herein is of the nature set forth at preceding points, being a so-called "dry" or thermoplastic adhesive that becomes activated when heated to a temperature of about 180° to 250° F.

In Fig. 4 two different fabric sheets are shown as fed through the apparatus. The relatively dry adhesive is applied to the upper face of the first sheet. Then the second fabric sheet is applied to the upper surface of the said first fabric sheet, and at a subsequent point a relatively dry thermoplastic adhesive is applied to the upper face of said second sheet, and the said two fabrics are rolled up together. Subsequently a third sheet may be applied to the said adhesive-coated face of said second fabric.

Referring more particularly to Fig. 4, the roll of the first or base fabric is indicated at 28, at the extreme right-hand end of the apparatus. The said fabric sheet is drawn from the roll 28, then passes over guide roll 29, under guide roll 30, and over guide roll 31. It then passes under the mass of thermoplastic adhesive indicated at 32, and the character of which I have described, and under the lower edge of the doctor blade 33, which is spaced from the upper face of the fabric sheet by a very slight distance, which may be as little as $5/1000$ of an inch. The said sheet of fabric is then met and becomes superimposed upon by the second fabric sheet, the supply roll of which is indicated at 34 upon an elevated part of the framing of the apparatus. Said second fabric sheet is drawn positively from the roll and passes about the guide rolls 35, 36 and under the guide roll 37, where it meets the first fabric sheet 28. Both fabric sheets then pass together about the guide rolls 38, 39.

In this apparatus shown in Fig. 4 there are represented as employed two heated cylinders or drums, the first of which is indicated at 40 and which may be of the same construction as the cylinder or drum 7 shown in Fig. 1 and hence need not be here more particularly described. It is desirably heated in the same way as the cylinder or drum 7 of Figs. 1, 2 and 3 to a temperature of about 250° F., and it is positively rotated in a forward direction, and in the passage of the two fabrics 28 and 34 thereabout, they become laminated together. In such condition they pass about the guide rolls 41, 42 and 43. Desirably, just beyond the guide roll 43, the two fabric sheets 28 and 34, laminated together with the fabric sheet 34 uppermost, pass under a mass of the same character of adhesive at 44, which is just behind the doctor blade 45, the lower edge of which is very close to the upper surface of the overlying fabric sheet 34, as, for example, about $5/1000$ of an inch therefrom. Thus the upper face of the said fabric 34 becomes coated with the adhesive, and in such condition the two laminated-together fabrics 28 and 34 pass about the second heating drum or cylinder 46, which may be identical in construction with the drum or cylinder 7 and be heated in the same way and be similarly driven in a forward direction.

Desirably, the said two fabrics 28 and 34 then pass over a guide roll 47 and then down and about a guide roll 48. They then pass forward through an area 49, being drawn positively to and under a guide roll 50. The space between the two guide rolls 48 and 50 I term a cooling area (which is very essential in this apparatus), and there the temperature of the two laminated-together fabrics 28 and 34 become substantially reduced. The said two fabrics 28 and 34 pass between the rolls 51, 52, mounted in the support or bearing member 53, the lower roll 51 being desirably driven, and said two fabrics in their laminated condition are wound up together into a roll 55.

It is to be understood that to the upper, coated face of the fabric 34 another fabric sheet may now be applied by unrolling the roll 55 and feeding it into the apparatus of Figs. 1, 2 and 3.

I may apply a third fabric sheet to the upper coated face of the fabric sheet 34 just to the left of the doctor bar 45, so that all three fabric sheets pass together about the second heating cylinder or drum 46, so that there are then three fabric sheets of equal area laminated together. Such third fabric sheet would be supported upon the framing at a suitable point, in the same manner as the fabric rolls 28 and 34, and would be positively drawn forward and smoothly superimposed upon the upper coated surface of said fabric sheet 34.

I have in Fig. 5 represented quite diagrammatically a still further embodiment of apparatus and whereby a single fabric may have applied to the upper face thereof a thin coating of thermoplastic adhesive and to which small units of skins or the like may be applied, but such product would not thereafter, of course, be fed through the apparatus of Figs. 1, 2 and 3.

Therein I have not represented the framing of the apparatus, but it may be generally similar to that shown in Fig. 1, being altered to permit the manual application of separate units of skins or hides or other material.

In said Fig. 5 a roll of fabric material 55 is suitably supported, being, if desired, supported in a cradle of freely rotatable rolls (not shown) and which may be similar to the rolls of the cradles 2 and 3 of Fig. 1. The said fabric sheet is positively drawn away from its roll 55 upward and about a guide roll 56, which may itself be positively driven. The fabric sheet is then drawn by such of the rolls as may be positively driven or by the heating drum or cylinder to be referred to, along a level part of the framing and which is of sufficient width to receive a fabric sheet of any desired width. At a suitable point, as indicated at 57, there is placed a mass of the thermoplastic adhesive material of the character already described, and which, of course, is kept in sufficient quantity just behind and against a doctor bar 58 which may be similar to those shown or indicated in Fig. 4 and which therefore may extend very close to the upper surface of the traveling fabric sheet, being spaced therefrom preferably by as little as 5/1000 of an inch.

The thus coated fabric sheet passes forward over a guide roll 59 and then down, about and up over a heating cylinder or drum 60, which may be and preferably is of the same character and construction as the heating cylinder or drum 7 of Fig. 1, and therefore is heated to a sufficient degree, as, for example, of about 250° F., and thereby the fabric sheet in passing about the same is sufficiently heated until the thermoplastic adhesive on one face thereof becomes thereby activated at a temperature of about 180° to 250° F.

The fabric sheet then passes about guide roll 61, then up over guide roll 62 and then down between the two rolls 63, 64, both of which may be positively driven. I so construct the framing of the apparatus that beyond the rolls 63, 64 sufficient room or space is provided so that two operators, standing at each side of the apparatus, may carefully apply to the upper face of the fabric sheet small units of material indicated at 65 and which may be skins, or pieces of hide, or any other suitable material. These units are carefully, manually, smoothly applied to the upper face of the fabric sheet, so as to cover as much as possible of the upper face. The fabric sheet with the so-applied small units 65 is wound up into a roll 66, and such product is now complete and is ready to be cut up into small units.

I have herein disclosed that in the practice of my invention I may employ or use a single base material or fabric sheet and the application of adhesive material is made to one face thereof, only. I have also disclosed the employment of a single base material or fabric sheet and the application of adhesive material to both faces thereof. I have also disclosed the laminating together of three and even of four materials, all of which may be in sheet form, or at one or even to both faces of a sheet there may be applied units. I have in each case done this by the employment of an adhesive of the character explained, which is of a thermoplastic nature. In laminating three or four materials, this is done by uniting by the adhesive two fabric sheets or units and, by the application of an adhesive, another or third fabric is laminated to the outer face of one of said two sheets, and also by the application of an adhesive, there are applied a third and a fourth fabric or unit to the outer faces of both the said first and second fabric sheets.

Any and all of the foregoing may be effected by the comparatively simple apparatus herein disclosed in Figs. 1, 2 and 3 and which, as I have stated, I may, for example, manufacture and lease to shoe manufacturing plants which therefore may readily secure to the foundation parts of the shoes, the uppers or other parts, as herein disclosed, whether as a single layer or as two, three, or four layers laminated together.

It is to be understood that in the practice of my invention I may positively feed through the apparatus of Figs. 1, 2 and 3, one, two, three, four or even more sheets of material, all of the same width, and having at each two next adjacent faces a very thin coating of adhesive material of the thermoplastic character herein set forth, and to the uppermost face I apply, in accordance with my invention, an adhesive which becomes activated only when the temperature thereof is raised to a temperature of about 180° to 250° F.

It is also to be understood that any one or more of said coatings of adhesive material may be applied during the passage of such sheets through the preliminary apparatus of Fig. 4.

It is to be understood that the base sheet may be of any suitable material. I have herein at many points referred to it as a fabric. Such fabric may be of any suitable character, as, for example, a woven fabric of any suitable material or materials. It may be what is known in the art as a drill. One or both faces of such drill or other fabric sheet may be coated with the adhesive, being either precoated or coated during the passage through the apparatus of Fig. 4 for example. Whether only one or both faces is or are coated with adhesive depends, of course, upon just what laminated article is being made. I may even manually apply, in the manner desired, small unit sheets or pieces to both outer faces of the one or more sheets of material that are in a face-to-face relation.

It is also to be understood that I may feed the drill or other fabric through the apparatus of Fig. 4, coating therein both faces of such sheet material with the desired adhesive, but not adhesively securing to such sheet any other material, and I may ship the resulting article to a shoe or other factory which will itself apply to such fabric by the use of my apparatus shown in Figs. 1, 2 and 3, one other fabric or two other fabrics, as desired, according to what is being or is to be manufactured at such shoe or other factory.

It is to be understood that the applying of such double coating, that is, the coating with the adhesive of the two outer faces—whether of one fabric or of two so adhesively joined fabrics—is within the intent of use of my invention, and in such case and by using the apparatus of Fig. 3, two other sheets of material are to be applied respectively to said two outer coated surfaces—one to each outer face—this being done by heating the said fabric sheet or sheets having the two outer coated surfaces to a temperature of about 180° to 250° F., thereby activating such thermoplastic adhesive material on said two outer faces.

So far as I am aware, it is new in the art to provide a laminated article having a sheet at the center and a fabric at both faces, all secured by an adhesive, and to apply to the uppermost face a thermoplastic adhesive coating that becomes activated only when raised to an elevated temperature, and to which coated surface another sheet or small units may be applied by the use of a small, compact, readily operated apparatus that may be placed in plants and factories and operated satisfactorily by unskilled help. This is an important feature of my invention. One construction of such an apparatus is represented in Figs. 1, 2 and 3. I may also similarly coat the exposed outer faces or one of such faces of the three fabrics referred to with the adhesive in the manner desired, so that I may apply a fourth and even a fifth sheet of material, thus making an article of four or five fabric sheets.

It is to be noted that the apparatus herein described, and illustrated in Figs. 1, 2 and 3, does not have to be cleaned, because the adhesive material is a thermoplastic and is what I term "relatively dry" and is not a liquid or near-liquid which, if used, requires the frequent cleaning of the apparatus.

The cylinder or drum of Figs. 1, 2 and 3, provided with means for heating the periphery thereof to about 250° F., may be of any suitable material. I may employ stainless steel.

The faille to which I have referred is preferably used as a rayon lining for women's shoes.

Having thus described certain embodiments of apparatus representing my invention, and having described the method or process of my invention with particularity, I desire it to be understood that although specific terms have been employed, they are used in a generic sense and not for purposes of limitation, the scope of the invention being set forth in the following claim.

I claim:

A compact readily portable activator and laminator for shoe-upper-base flexible sheet material supplied in dry thermoplastically precoated roll form for on-the-job shoe-upper finish-layer application by the shoe manufacturer in accordance with then current style dictates, comprising a separable plural-part frame assembly readily portable between use points in a shoe factory, plural-roller cradle means for supporting one or more supply rolls of such dry precoated base-material in position to be drawn on, rotative feeding and guiding means for said material, a rotary drum disposed for passage of the material about the periphery thereof, electrical means within the drum for heating to coating-activating temperature the material passing about it, and further feeding and take-up rotary means for the adhesively activated material, said feeding and rotary means adapted to receive a plug-in electric motor drive, and said take-up means positioned with respect to the feeding means to provide en route to the take-up a linear zone of travel for the coating-activated material at which the activated face is exposed for reception and adhesive application thereto of a shoe-upper finish lamina comprising multiple disjoint pieces of selected composition, area and continuity, whereby to finish-fabricate at the shoe factory the desired shoe-upper material.

References Cited in the file of this patent

UNITED STATES PATENTS

| | | |
|---|---|---|
| 2,017,200 | Beck | Oct. 15, 1935 |
| 2,291,955 | Emmey | Aug. 4, 1942 |
| 2,334,485 | Ettl | Nov. 16, 1943 |
| 2,361,418 | Robinson | Oct. 31, 1944 |
| 2,428,385 | Reynolds | Oct. 7, 1947 |
| 2,433,965 | Upson | Jan. 6, 1948 |
| 2,434,795 | Glasing et al. | Jan. 20, 1948 |
| 2,584,002 | Elser et al. | Jan. 29, 1952 |
| 2,656,050 | Best et al. | Oct. 20, 1953 |